Patented June 1, 1926.

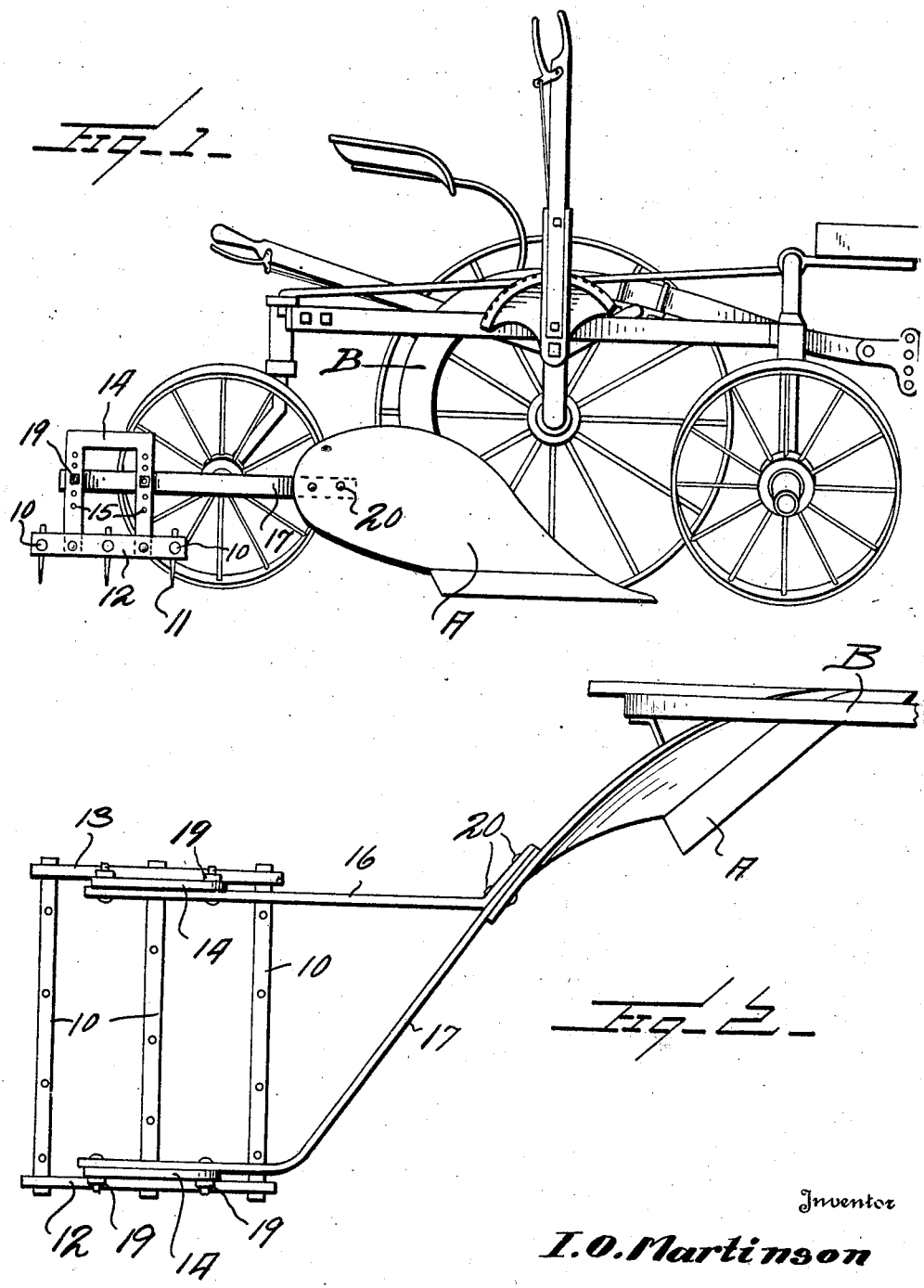

1,587,081

UNITED STATES PATENT OFFICE.

INGEBRIT O. MARTINSON, OF SCARVILLE, IOWA.

PLOW DRAG.

Application filed July 30, 1925. Serial No. 47,084.

This invention relates to plow attachments, and particularly to a harrow-like drag designed to be mounted upon the plow and drag immediately back of the mold board and acting to level and in a sense harrow the earth turned up by the mold board.

The general object of the invention is to provide a device of this character which is extremely simple, which may be readily attached in place, either upon a sulky plow or a gang plow, which may be raised or lowered as the plow is raised or lowered, and which is vertically adjustable so that the drag may be disposed at the proper height.

My invention is illustrated in the accompanying drawing, wherein:—

Figure 1 is a side elevation of a plow with my drag applied thereto;

Figure 2 is a top plan view of a portion of the plow share and beam with my drag applied thereto.

Referring to this drawing, A designates the mold board of a plow and B the beam thereof. This plow may be a sulky plow or a gang plow and I do not wish to be limited to the particular character of plow to which my attachment is applied. The drag attachment comprises a plurality of parallel, transversely extending bars 10 having downwardly depending harrow teeth 11 which may be inserted through apertures in the bars and held in any suitable manner. The bars 10 are connected by longitudinally extending bars 12 to which the bars 10 are attached by any suitable means.

Attached to the bars 12 and extending upward therefrom at each end are the U-shaped supports 14, the legs of which are formed with a plurality of perforations 15. These supports are rigidly bolted to the bars 12 and extend upward at opposite ends of the frame formed by the bars 10 and 12.

For the purpose of connecting this drag to the plow, I provide the straight longitudinally extending draft rod 16 and the draft rod 17 which converges at its forward end toward the draft bar 16 and is engaged therewith, this draft rod 17 extending laterally and rearwardly in divergent relation to the rods 16 and then has a portion 18 which extends parallel to the rod 16. The draft rod 16 and the straight rear portion of the draft rod 17 are bolted to the supports 14 by bolts 19 passing through the perforations 15. By providing a plurality of perforations in the legs of the U-shaped supports 14, it is possible to adjust the drag higher or lower with reference to the plow share or mold board so that the teeth of the drag will extend just a sufficient distance into the ground. The draft rods 16 and 17 are connected to the rear end of the mold board by bolts or other suitable fastenings 20.

The usual lifting mechanism is used in conjunction with the plow and inasmuch as the device is attached to the rearwardly extending wing of the mold board, it is obvious that as the plow is raised the harrowing device is raised and as the plow is lowered the harrowing device will be lowered. Any lifting mechanism which will operate to raise or lower the plow may be used. Of course, in sulky plows the lifting mechanism fastens to the mold board of the plow, while in gang or triple plows on tractors the lifting mechanism fastens on the beam.

I claim:—

The combination with a plow, of a drag attachment comprising a supporting frame having downwardly projecting harrow teeth, U-shaped supporting members mounted upon the frame, each having its legs formed with a vertical series of perforations, forwardly converging draft and supporting bars at their rear ends extending across the U-shaped members and being engaged therewith by bolts passing through the perforations and the forward ends of said draft members being attached to a part of the plow.

In testimony whereof I hereunto affix my signature.

INGEBRIT O. MARTINSON.